United States Patent
Granger et al.

(10) Patent No.: US 12,077,015 B2
(45) Date of Patent: Sep. 3, 2024

(54) TORSION AXLE ASSEMBLY

(71) Applicant: TRIBOLOGY INNOVATIONS, LLC, Safety Harbor, FL (US)

(72) Inventors: James L. Granger, Safety Harbor, FL (US); Alex G. Hessler, St. Petersburg, FL (US)

(73) Assignee: TRIBOLOGY INNOVATIONS, LLC, Safety Harbor, FL (US)

( * ) Notice: Subject to any disclaimer, the term of this patent is extended or adjusted under 35 U.S.C. 154(b) by 200 days.

(21) Appl. No.: 17/406,291

(22) Filed: Aug. 19, 2021

(65) Prior Publication Data

US 2022/0055404 A1   Feb. 24, 2022

Related U.S. Application Data

(60) Provisional application No. 63/067,624, filed on Aug. 19, 2020.

(51) Int. Cl.
   *B60B 35/06*   (2006.01)
   *B60B 35/02*   (2006.01)

(52) U.S. Cl.
   CPC ............. *B60B 35/06* (2013.01); *B60B 35/02* (2013.01); *B60B 2310/204* (2013.01);
   (Continued)

(58) Field of Classification Search
   CPC ............. B60B 36/06; B60B 2310/204; B60B 2310/3025; B60B 2310/306;
   (Continued)

(56) References Cited

U.S. PATENT DOCUMENTS

| | | | | |
|---|---|---|---|---|
| 2,852,269 A | * | 9/1958 | Gaines | B60G 21/055 |
| | | | | 280/124.137 |
| 3,183,018 A | * | 5/1965 | Holmstrom | B60G 5/043 |
| | | | | 267/273 |

(Continued)

FOREIGN PATENT DOCUMENTS

| | | | |
|---|---|---|---|
| CN | 102286726 A | * | 12/2011 |
| DE | 102011050641 A | | 5/2011 |

(Continued)

*Primary Examiner* — S. Joseph Morano
*Assistant Examiner* — Eva L Comino
(74) *Attorney, Agent, or Firm* — Shumaker, Loop & Kendrick, LLP; Jeffrey B. Fabian

(57) ABSTRACT

Disclosed are modular mechanical assemblies formed from durable, corrosion resistant components with sufficient strength to maintain efficient operation. The modular mechanical assemblies include a novel torsion axle assembly having a cartridge that houses a torsion bar with a splined tip. A load bearing, relatively incompressible bushing is optionally disposed about the torsion bar. The cartridge is inserted into an axle tube, and an end cap is placed over the cartridge and torsion bar. The end cap is affixed to the axle tube such that the bushing is secured within a bore in the end cap. The torsion bar tip extends through the bushing and end cap and is secured within a torsion arm. A spindle is also secured within the torsion arm. One or more components of the torsion axle assembly are made from a low alloy, medium carbon steel material that provides corrosion resistance and advantageous yield and ultimate strength properties. One or more components of the assembly can also be coated to improve corrosion resistance. Suitable coating techniques include, but are not limited to liquid ferritic nitrocarburizing, gas nitriding, electroless nickel plating, or a diamond like carbon coating process.

18 Claims, 10 Drawing Sheets

(52) U.S. Cl.
CPC . *B60B 2310/3025* (2013.01); *B60B 2310/306* (2013.01); *B60B 2310/318* (2013.01); *B60B 2310/616* (2013.01); *B60B 2360/102* (2013.01); *B60B 2360/50* (2013.01); *B60B 2900/141* (2013.01); *B60B 2900/212* (2013.01); *B60B 2900/321* (2013.01)

(58) Field of Classification Search
CPC ........ B60B 2310/318; B60B 2310/616; B60B 2900/141; B60B 2900/221; B60B 2900/321; B60B 35/004; B60B 35/08; B60B 35/14; B60B 35/16; B60B 35/163
USPC ........................................................ 301/132
See application file for complete search history.

(56) References Cited

U.S. PATENT DOCUMENTS

| | | | |
|---|---|---|---|
| 5,158,321 A | 10/1992 | Maul | |
| 5,163,701 A * | 11/1992 | Cromley, Jr. | B60G 11/185 |
| | | | 280/124.13 |
| 5,277,450 A | 1/1994 | Henschen | |
| 5,714,015 A * | 2/1998 | Lentz | C21D 9/36 |
| | | | 148/319 |
| 6,299,259 B1 | 10/2001 | MacKarvich | |
| 6,340,165 B1 * | 1/2002 | Kelderman | B60G 21/0556 |
| | | | 280/124.153 |
| 6,447,073 B1 | 9/2002 | Goettker | |
| 7,234,783 B2 * | 6/2007 | MacKarvich | F16B 7/042 |
| | | | 301/124.1 |
| 7,854,439 B2 | 12/2010 | Lee | |
| 8,191,911 B1 | 6/2012 | Reynolds | |
| 8,256,782 B2 * | 9/2012 | VanDenberg | B60G 11/225 |
| | | | 280/124.128 |
| 8,573,621 B1 * | 11/2013 | Reynolds | B60G 11/225 |
| | | | 280/124.13 |
| 8,827,015 B2 | 9/2014 | Power et al. | |
| 9,016,703 B2 | 4/2015 | Rowe et al. | |
| 9,174,506 B2 | 11/2015 | Drewes | |
| 10,173,467 B2 | 1/2019 | Christ | |
| 10,434,833 B1 | 10/2019 | Samet et al. | |
| 10,618,351 B2 | 4/2020 | Dombroski et al. | |
| 2003/0106617 A1 * | 6/2003 | Black | C23C 8/32 |
| | | | 148/217 |
| 2011/0068550 A1 | 3/2011 | Lariviere | |
| 2015/0114730 A1 | 4/2015 | Gulliksson | |
| 2015/0145229 A1 * | 5/2015 | Dunlap | B60G 11/225 |
| | | | 280/124.125 |
| 2018/0162163 A1 * | 6/2018 | Dombroski | B60B 35/004 |
| 2019/0299711 A1 | 10/2019 | Gagnon | |
| 2020/0070575 A1 | 3/2020 | Christ et al. | |

FOREIGN PATENT DOCUMENTS

| | | | | |
|---|---|---|---|---|
| DE | 102011050641 A1 * | 11/2012 | | C23C 8/24 |
| JP | H06322555 | * | 5/2019 | A61B 5/150022 |
| WO | 2016/026660 A1 | 2/2016 | | |

* cited by examiner

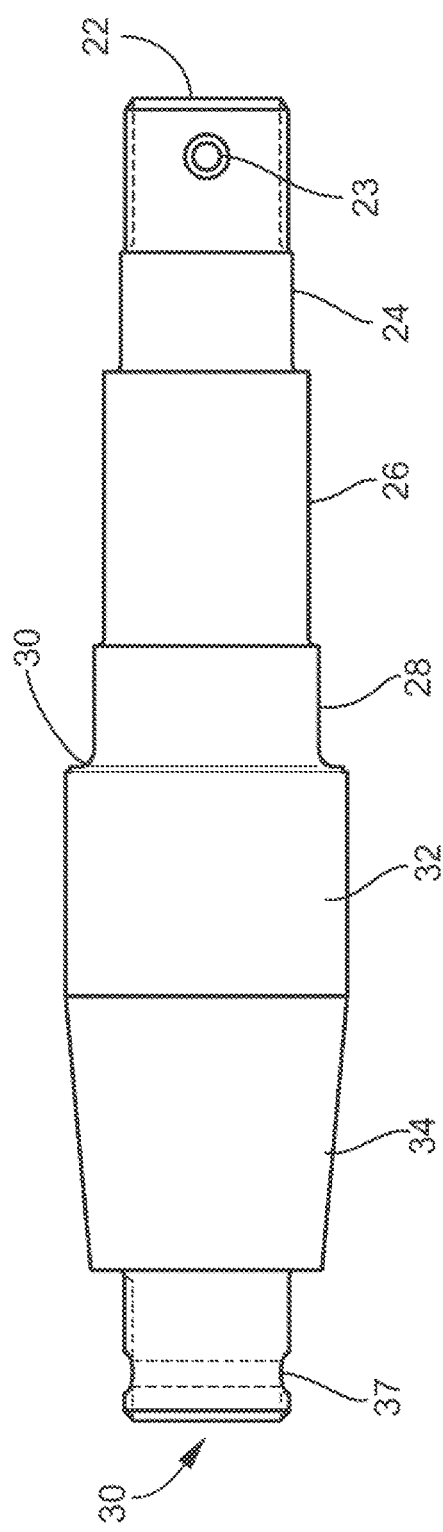
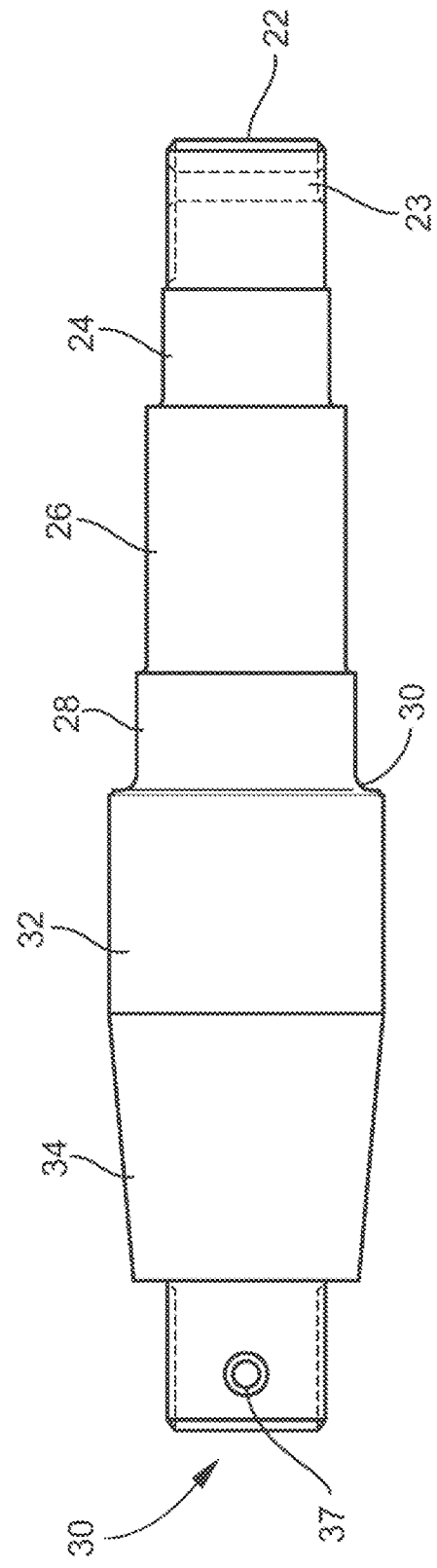
FIG. 6A
FIG. 6B

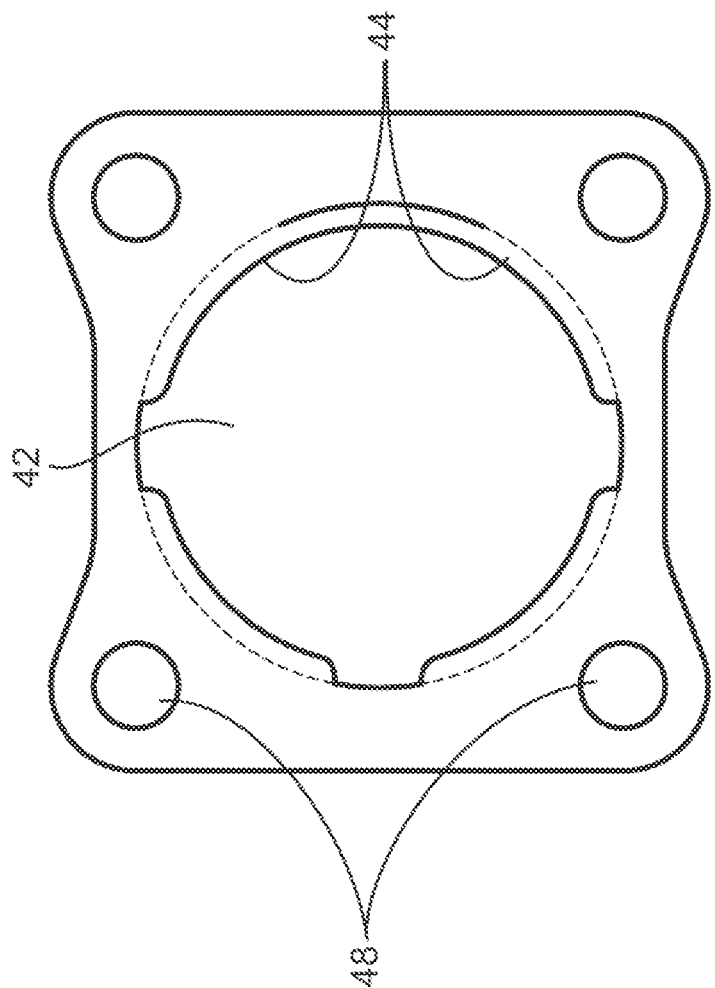
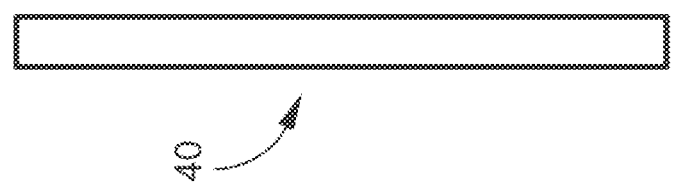
FIG. 7B
FIG. 7A

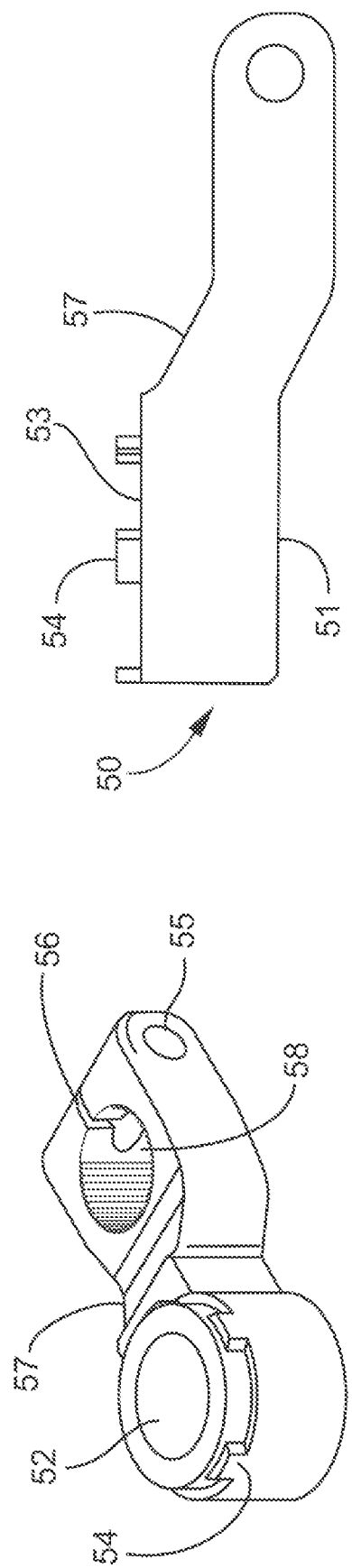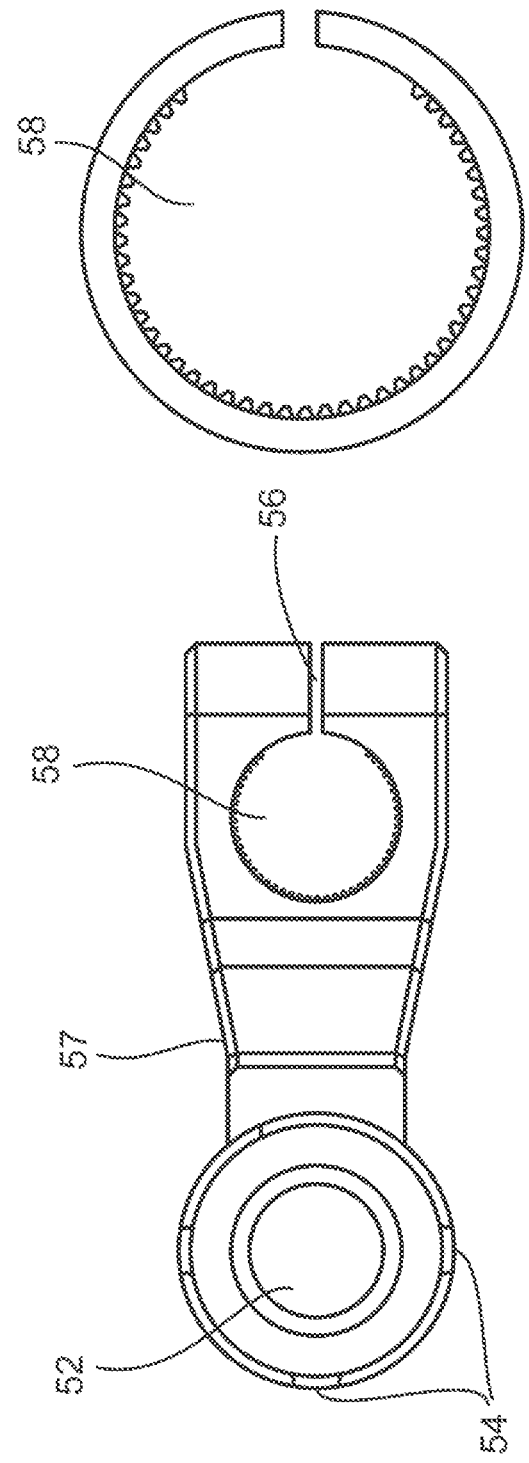

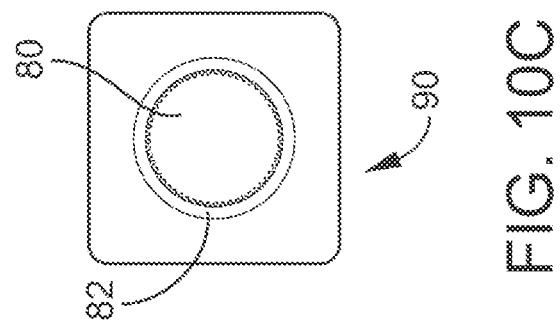
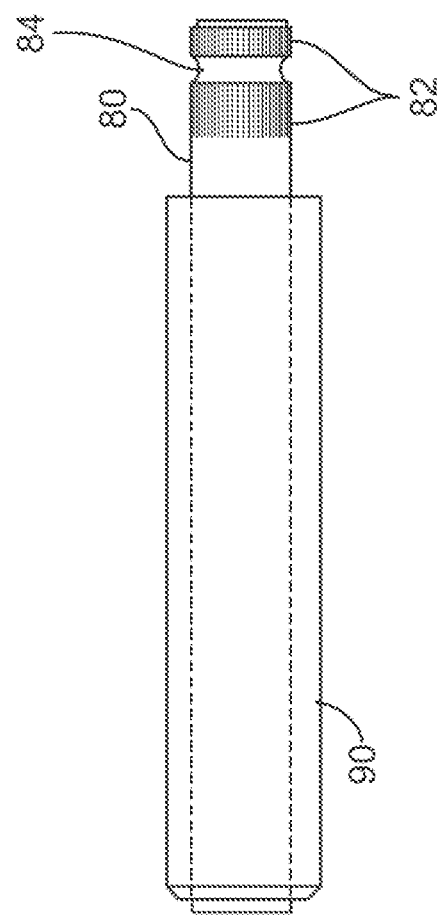
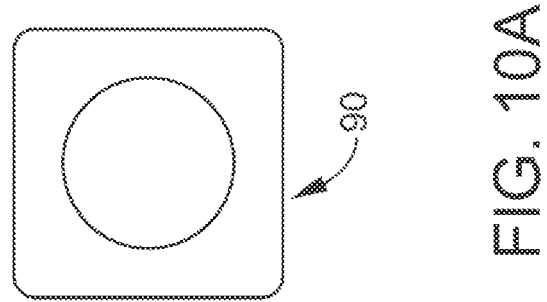

TORSION AXLE ASSEMBLY

TECHNICAL FIELD AND BACKGROUND

The present invention relates generally to durable, corrosion resistant mechanical assemblies and in particular, a modular torsion axle assembly with enhanced durability and corrosion resistance properties.

Conventional mechanical assemblies such as torsion axles are commonly made from plain carbon steels that provide adequate material strength but that are not corrosion resistant. For applications where a mechanical assembly is exposed to moisture, the assembly components may rust or corrode over time leading to mechanical failure and causing the components to fuse together. The result is that not only do the mechanical assemblies break down, but the assemblies are difficult to repair because the components are fused together or rendered unusable by corrosion. In that case, proper repair typically requires that multiple components be replaced at the same time, which increases cost, complexity, and time required to complete the repair. Given the tendency for parts to fuse together or become unusable, manufacturers tend to form multiple functional parts of a mechanical assembly as a single, unitary component that must be replaced during a repair, which increased the materials cost for a repair.

What is needed are mechanical assemblies formed from durable, corrosion resistant materials with sufficient strength to maintain proper functionality. This in turn would facilitate the manufacturing of mechanical assemblies in a modular fashion where individual functional components are separable. The components would be less likely to fuse together or be susceptible to mechanical failure from corrosion. The result would be that mechanical failures can be isolated, and fewer components would need to be replaced during a repair leading to faster, less costly repairs.

It is, therefore, an object of the present invention to provide modular mechanical assemblies that are formed from durable, corrosion resistant components with sufficient strength to maintain efficient operation. In particular, the present application discloses a novel torsion axle assembly with advantageous mechanical functionality, durability, and corrosion resistance.

SUMMARY

A first embodiment of a torsion axle assembly includes a spindle that has a body portion, a torsion bar, a cartridge, and a torsion arm. The torsion bar has a tip and a first set of splines residing on the tip. The cartridge is disposed about the torsion bar and encompasses the torsion bar except for the torsion bar tip that extends outward from a first end of the cartridge. The torsion arm includes a spindle socket and a torsion bar socket. The torsion bar socket has a second set of splines formed on an interior surface of the torsion bar socket that mate to the first set of splines on the torsion bar tip. The spindle extends into the spindle socket, and the spindle body frictionally engages an interior surface of the spindle socket to secure the spindle within the spindle socket. The spindle, torsion bar, and torsion arm each further comprise a protective coating.

The protective coating can be formed using processes such as liquid ferritic nitrocarburizing, a diamond like carbon coating process, or an electroless nickel plating process. The protective layer can incorporate different materials, such as iron carbonitride, a diamond like carbon coating, or a nickel alloy. The spindle, torsion arm, and torsion bar can be made of a corrosion-resistant low alloy, medium-carbon steel. The components of the assembly can be conditioned prior to applying the protective coating using techniques such as vibratory polishing, grinding, bead blasting, shot peening, or sanding.

In one embodiment, the spindle, torsion bar, and torsion arm each have a surface hardness greater than 700 HV, and each of these parts includes a compound layer of iron carbonitride having a depth of 10-25 µm from an outer surface that is part of the protective layer. The spindle, torsion bar, and torsion arm can each further include a layer of black iron oxide formed on an outer surface of these components.

The torsion axle spindle can incorporate features that are designed to fail at a predetermined force threshold to preserve other components of the axle assembly. In other words, the spindle which can be readily replaced, is designed to fail first, thereby preventing the failure of other components in high-stress use circumstances. The spindle embodiment would include a first stepped portion and a second stepped portion of different diameters with a fusible link between the first stepped portion and the second stepped portion where the fusible link is designed to fail at a predetermined applied load.

In another embodiment, the cartridge is made from an elastomeric material, such as a polyisoprene rubber. The cartridge can be bonded to the torsion bar with an enhanced binding process that uses a primer layer made from a first bonding agent that is formed on the torsion bar outer surface and a cover layer made from a second bonding agent formed over the primer layer. The cartridge is then molded to the torsion bar using compression molding or other suitable techniques. Bonding the cartridge to the torsion bar using the enhanced binding process substantially increases the strength of the bond between the two components over conventional compression molding techniques.

In yet another embodiment, the torsion axle assembly optionally includes additional components, such as a bushing that works to absorb some vertical load otherwise absorbed by the cartridge. This embodiment includes a cartridge secured within an axle tube and a torsion bar secured within the cartridge. The torsion bar has a tip with a first set of splines extending around the outer circumference of the tip. A bushing is disposed about the torsion bar. An end cap is affixed to the axle tube, and the bushing is secured within an end cap bore. The torsion bar tip extends through the bushing and through the end cap bore. The torsion bar tip extends into and is secured within a torsion bar socket having a second set of splines configured to couple to the first set of splines. The assembly also includes a torsion arm having a torsion bar socket, a spindle socket, and a neck extending between the torsion bar socket and the spindle socket. A planar brake flange with a brake flange void is coupled to the spindle socket using keys on the outside of the spindle socket. A spindle is secured within the spindle socket. A protective coating disposed on an outer surface of the torsion bar, torsion arm, and spindle.

Another embodiment of a torsion axle assembly includes a torsion arm having a spindle socket and a torsion bar socket, and a torsion bar having a tip that is housed within the torsion bar socket. A spindle is secured within the spindle socket. A protective coating is disposed on the torsion arm, torsion bar, and spindle, where the protective coating includes at least one of the following materials: iron carbonitride, a diamond like carbon material, or a nickel alloy.

The protective coating can be conditioned to form a conditioned surface. The conditioned surface can be formed from a shot-peened material where shot medium is impinged upon the surface of the protective coating. The torsion arm, torsion bar, and spindle can also include a layer of black iron oxide disposed on the outside surface of these components.

The forgoing embodiment can also include a cartridge bonded to the torsion bar using the enhanced binding process. That is, the torsion axle assembly includes a primer layer disposed on an outer surface of the torsion bar where the primer layer is made from a first bonding agent. The torsion axle assembly also includes a cover layer disposed on the primer layer where the cover layer is made from a second bonding agent. The rubber cartridge is then bonded to the torsion bar when the cartridge is formed by compression molding, except that the tip of the torsion bar extends outward from a first end of the cartridge.

In one embodiment, the torsion bar and cartridge are sized to provide a universal fit to various load-rated and sizes of drop axle trailer configurations. There, the cartridge is disposed about the torsion bar where the tip of the torsion bar extends outward from a first end of the cartridge along a first axis. For applications where the cartridge and torsion bar are to be used in an axle having a 3,500 pound load capacity, the cartridge and torsion bar can be constructed with a length in the direction of the first axis that is between 14 inches and 14.7 inches.

BRIEF DESCRIPTION OF THE FIGURES

Features, aspects, and advantages of the present invention are better understood when the following detailed description of the invention is read with reference to the accompanying figures, in which:

FIG. 6A is a first side view of a spindle according to one embodiment.

FIG. 6B is a first side view of a spindle according to one embodiment.

FIG. 7A is a side view of a brake flange according to one embodiment.

FIG. 7B is a front view of a brake flange according to one embodiment.

FIG. 9A is a top, perspective view of a torsion arm according to one embodiment.

FIG. 9B is a side view of a torsion arm according to one embodiment.

FIG. 9C is a top, perspective view of a torsion arm according to one embodiment.

FIG. 9D is a top view of a torsion bar receiving socket according to one embodiment.

FIG. 10A is a rear view of a suspension cartridge according to one embodiment.

FIG. 10B is a side view of a suspension cartridge according to one embodiment.

FIG. 10C is a front view of a suspension cartridge according to one embodiment.

DETAILED DESCRIPTION

Figure 1:
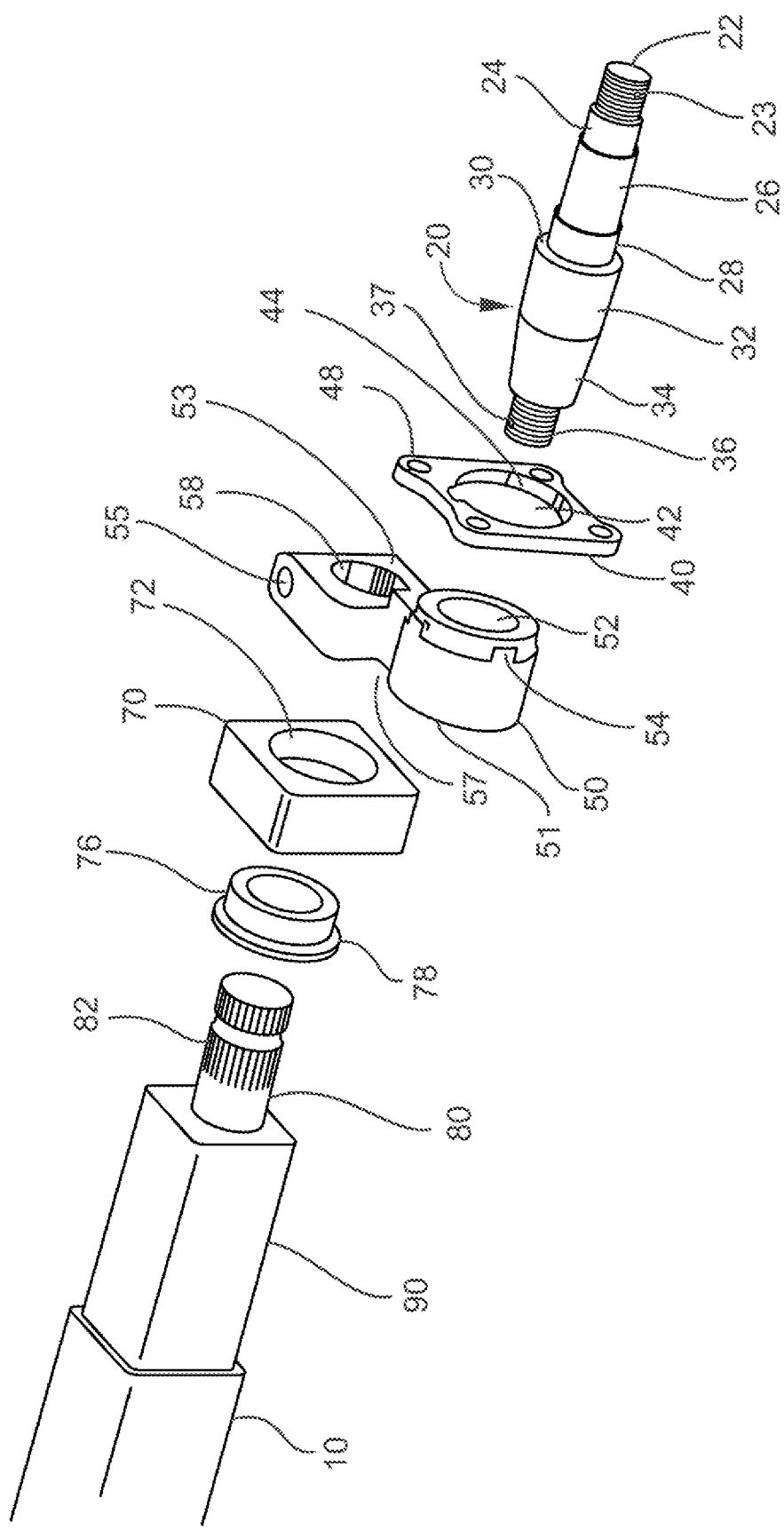
FIG. 1 is an exploded top, perspective view of a torsion axle assembly according to one embodiment.

The present invention will now be described more fully hereinafter with reference to the accompanying pictures in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

The Assembly Components and Operation

Disclosed are modular, durable, corrosion resistant mechanical assemblies manufactured with coated steel materials. The mechanical assemblies are discussed with reference to torsion axle assemblies, but those of skill in the art will appreciate that the components, materials, and methods disclosed herein find applicability to a variety of fields where mechanical strength, durability, and corrosion resistance are critical properties to maintain proper functionality and performance.

The attached figures illustrate a torsion axle assembly that is highly corrosion resistant and constructed in a modular fashion so as to facilitate convenient and cost effective assembly and repair even under field conditions. Turning to FIGS. 1 through 5, a torsion axle assembly according to one embodiment includes a spindle 20, a brake flange 40, a torsion arm 50, an end cap 70, an optional bushing 76, a torsion bar 80, and a suspension cartridge 90. The suspension cartridge is housed within an axle tube 10 when the torsion arm assembly is installed on a trailer or vehicle.

The spindle 20 embodiment shown in the attached figures is formed as an elongated, generally cylindrical body having a threaded distal end 22, three stepped cylindrical portions (24, 26, 28), a shoulder 30, a body portion 32, a conical portion 34, and a threaded proximal end 36. The threaded distal end 22 includes a distal spindle aperture 23 for receiving a cotter or other type of pin, clip or other fastening means known to one of skill in the art to secure the spindle 20 to a wheel or other mechanical component. The threaded proximal end 36 likewise includes a proximal end aperture 37 for receiving a cotter or other type of pin, clip, or other fastening means known to one of skill in the art to secure the spindle 20 to the torsion arm 50.

Figure 2:
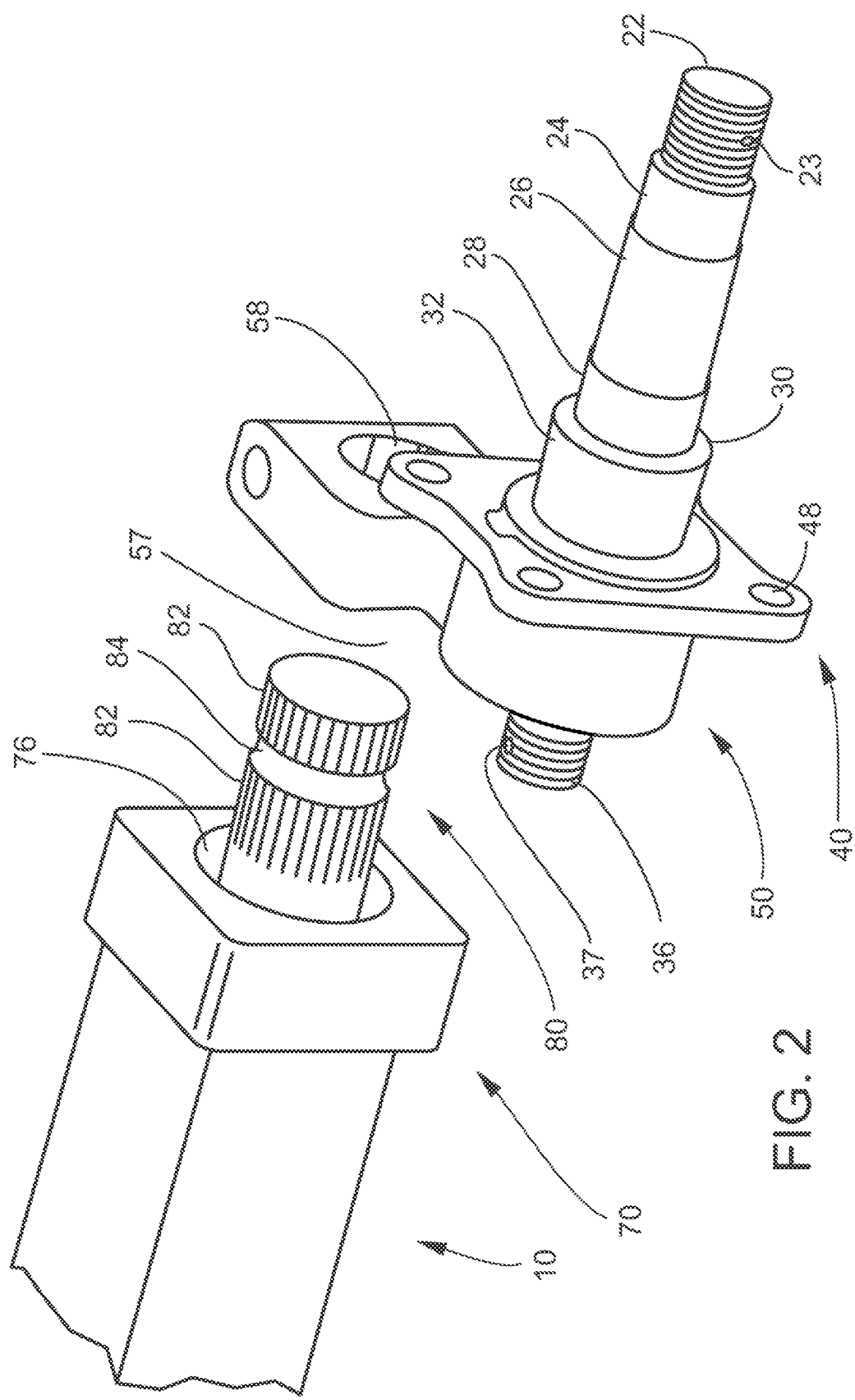
FIG. 2 is a top perspective view of a torsion axle assembly according to one embodiment.
Figure 3:
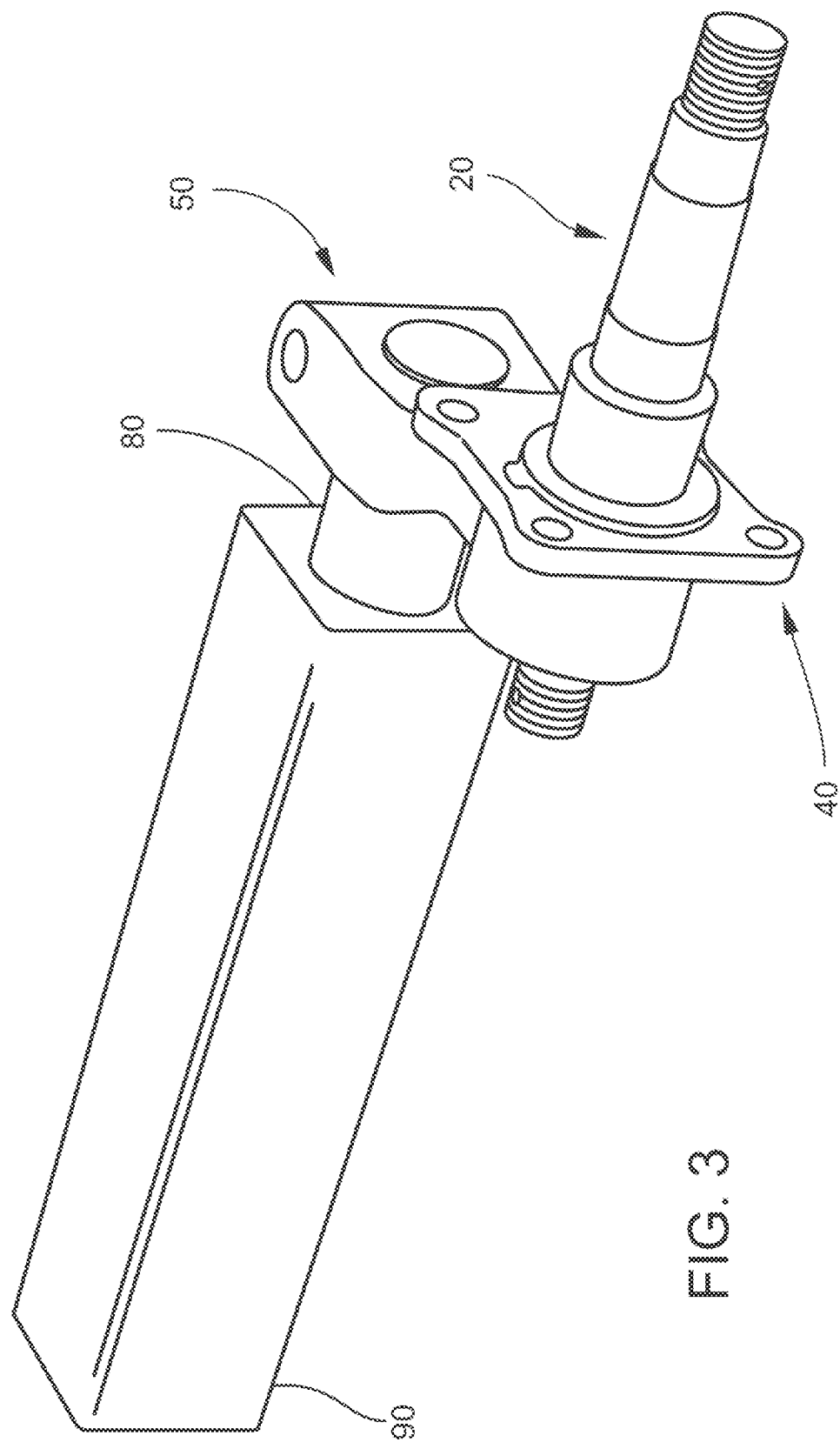
FIG. 3 is a top perspective view of a torsion axle assembly according to one embodiment.
Figure 4:
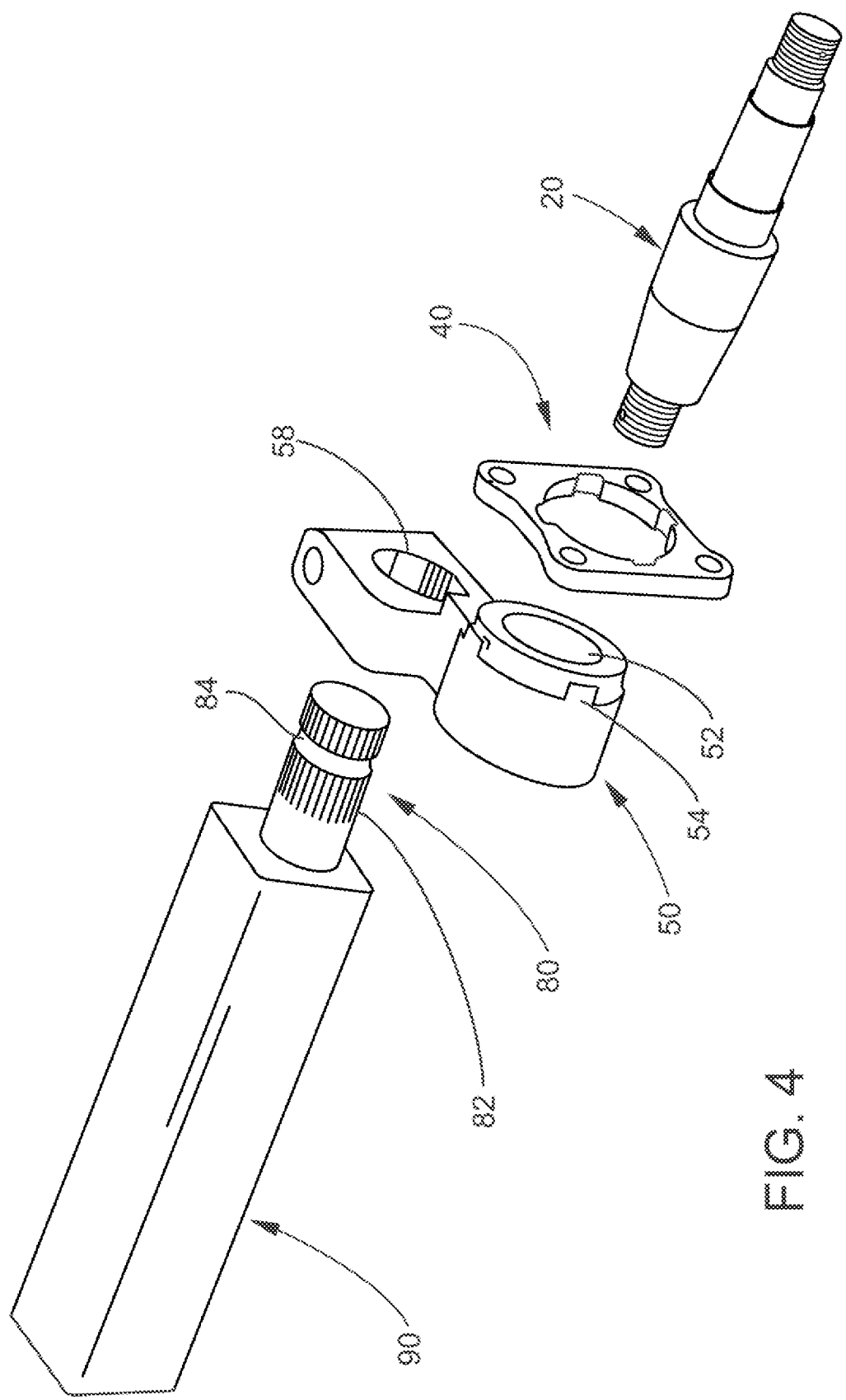
FIG. 4 is an exploded, perspective view of a torsion axle assembly according to one embodiment.
Figure 5:
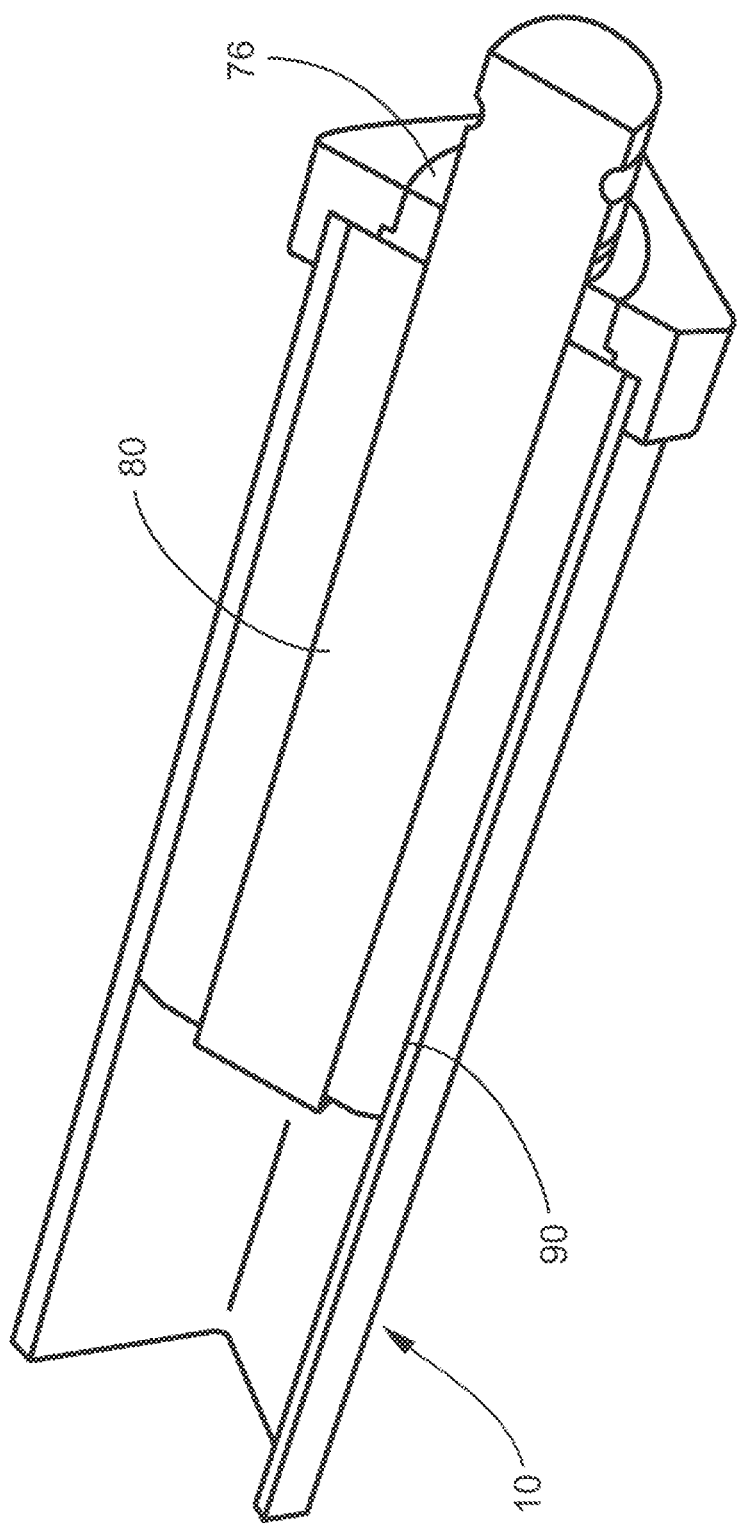
FIG. 5 is a cutaway view of an axle cross beam insert assembly according to one embodiment.

The torsion axle assembly optionally includes a brake flange 40 having a brake flange void 42 with key notches 44 extending along the circumference of the flange void 42. The brake flange 40 further includes one or more fastening apertures 48 that can accommodate fasteners to secure the brake flange 40 to a brake drum or disc. The brake flange 40 of the present torsion axle assembly provides the advantage over existing systems in that the current torsion axle assembly can be configured to accommodate various brake types and configurations by varying the number and arrangement of the fastening apertures 48 on the surface of the brake flange 40. The flange void 42 is sized such that it mates to the torsion arm spindle socket 52 while receiving the proximal end 36 of the spindle 20, as shown in FIGS. 2 and 3. The brake flange 40 mates to the spindle socket 52 by aligning keys 54 on the perimeter of the spindle socket 52 to the key notches 44 extending along the circumference of the brake flange void 42, thereby preventing the brake flange 40 from rotating when installed on the torsion arm 50.

The spindle body 32 and torsion arm spindle socket 52 are sized such that the outer surface of the conical portion 34 engages the interior surface of the spindle socket 52 when installed. The conical portion 34 of the spindle 20 is sized to allow the proximal end 36 of the spindle 20 to pass through the spindle socket 52 until the conical portion 34 engages the interior surface of the spindle socket 52.

Figure 8:
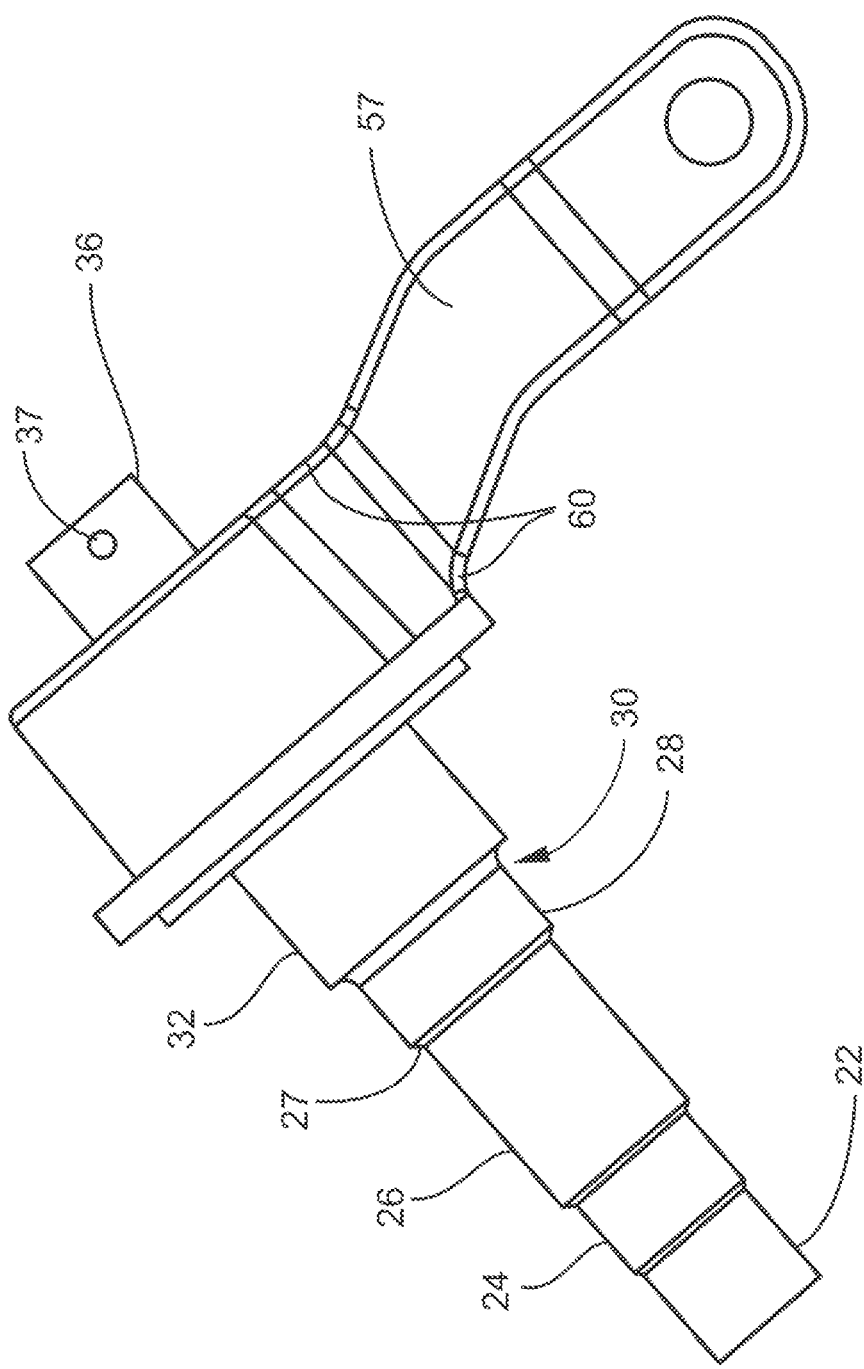
FIG. 8 illustrates an assembled spindle and torsion arm according to one embodiment.

The spindle 20 shown in the attached figures is designed with one or more fusible links 27 to provide a known failure point when the torsion axle assembly is subject to a predetermined amount of stress. For instance, the spindle 20 can be designed such that the spindle will fail through bending, deformation, or severance at a fusible link 27 between the second stepped portion 26 and the third stepped portion 28, as illustrated in FIG. 8. Upon failure, a wheel of the trailer or vehicle can be removed, and the torsion axle assembly can then be repaired by replacing just the spindle 20. The spindle 20 is more accessible than other components of the assembly, thereby allowing faster repairs even under field conditions when a trailer or vehicle is in use (i.e., broken down on a job site or on the side of the road). Including fusible links further improves durability and reliability of the torsion axle assembly by ensuring that the spindle 20 fails first before other components, thereby increasing the usable life of the other torsion axle assembly components.

The torsion arm 50 includes a first "top" surface 53 and a second "bottom" surface 51. The torsion arm 50 further includes an angled neck portion 57 that extends between the spindle socket 52 and a torsion bar socket 58 formed as a through hole in the torsion arm 50. The torsion arm angled neck portion 57 depicted in the attached figures includes additional material 60 for increased thickness proximal to the spindle socket 52, as shown in FIG. 8. The additional material increases strength 20% to 30%.

The torsion bar socket 58 is sized to accommodate the torsion bar 80. The torsion bar socket 58 is formed with splines extending along the interior surface that mate with splines 82 formed on the outer surface of a tip of the torsion bar 80. The splines 82 provide a frictional surface contact point that enables the torsion arm 50 to rotate with the torsion bar 80 and the cartridge 90. The torsion bar socket 58 end of the torsion arm 50 further includes a slot 56 and coupling aperture 55. A fastener can be inserted into the coupling aperture 55 and tightened to close the slot 56 and apply a clamping force that helps secure the torsion bar 80 within the torsion bar socket 58. When the torsion bar 80 is clamped within the torsion bar socket 58, the fastener inserted into the coupling aperture 55 becomes seated within a circumferential groove 84 within the torsion bar 80, thereby preventing the torsion bar 80 from becoming uncoupled from the torsion bar socket 58.

The end cap 70 is optionally affixed to the axle tube 10 such that the torsion bar splined tip 82 extends through the end cap bore 72 and into the torsion bar socket 58 to engage the splines within the torsion bar socket 58. The end cap 70 can be releasably or permanently (e.g., through welding) secured to or about the axle tube 10 to prevent moisture or particulate contaminants from entering the axle tube 10.

The cartridge 90 is a generally elongated body with a square cross section. The cartridge can include a channel or passage that is sized to accommodate the torsion bar 80 when the system is assembled and the cartridge 90 is installed in the axle tube 10. In other embodiments, the torsion bar 80 is formed as part of a single assembly with the cartridge 90 such that the torsion bar 80 is bonded to or affixed within the cartridge 90. Methods of forming the torsion bar 80 and cartridge 90 as a single assembly include over-molding an elastomeric cartridge 90 to the torsion bar 80.

The cartridge 90 can be formed from a compressible, elastomeric material, such as a high-density, high-durometer solid rubber. As an example, the cartridge 90 can be made from polyisoprene reinforced with hardness modifiers, such as silica or carbon black, to enhance hardness, tensile strength, tear resistance, and abrasion resistance. In one example embodiment, a polyisoprene cartridge 90 contains carbon black filler (type N330) at a weight percentage of 37%-45% and results in a Shore A durometer hardness of 67-73.

When the torsion bar 80 is formed as part of a single assembly with an elastomeric cartridge 90, the torsion bar 80 transfers a torsional load to the cartridge 90, which absorbs the applied load. The bond between the torsion bar 80 and cartridge 90 should be sufficiently strong to transfer torsion forces from the torsion bar 80 to the cartridge 90 without causing the two components to separate. Upon separation, the ability of the torsion bar 80 to transfer an applied load to the cartridge 90 becomes impaired as the torsion bar 80 begins to rotate independently from the cartridge 90.

Transfer of an applied load to the cartridge 90 can be better understood with reference to the following simplified example. During operation with a wheel installed on an axle, the wheel translates vertically up and down as the vehicle moves. The vertical translation of the wheel causes the torsion arm 50 to rotate about the torsion bar 80 disposed within the torsion bar socket 58. Rotation of the torsion bar 80 applies a torsion force to the cartridge 90 housed within the axle tube 10 that absorbs the applied load. In this manner, the torsion arm 50 operates to transfer substantially the entire torsional load from the wheel to the cartridge 90 through the torsion bar 80, thereby reducing stress applied to other assembly components that would otherwise result in component failure. If the torsion bar 80 separates from the cartridge 90, the ability to achieve the torsion load transfer is impaired.

In some embodiments, a bushing 76 can optionally be used to absorb forces applied by vertical wheel movement. During assembly, the bushing 76 is disposed about the torsion bar 80 with the bushing flanged end 78 engaging the cartridge 90. The end cap 70 is affixed to the axle tube 10 such that the bushing 76 fits securely within the end cap bore 72, and the torsion bar splined tip 82 extends through the bushing 76, the end cap bore 72, and into the torsion bar socket 58 to engage the splines within the torsion bar socket 58.

During operation with a bushing 76 installed, the torsion arm 50 transfers substantially the entire vertical load from the wheel of a trailer or vehicle to the bushing 76. Since the bushing 76 is relatively incompressible, the bushing 76 prevents substantial compression of the cartridge 90 along the vertical axis, which would otherwise diminish the effectiveness of the cartridge 90 and cause undue wear on the cartridge 90. The function of the cartridge 90 is to absorb torsion loads, which the torsion arm 50 transfers to the torsion bar 80. The torsion load bearing performance of the cartridge 90 is enhanced by the ability of the bushing 76 to bear substantially all of the vertical load on the torsion arm 50 to the exclusion of the cartridge 90.

Torsion Bar and Cartridge Bonding

Notably, when the torsion bar 80 is covered with a non-sacrificial protective coating, such as the coatings disclosed below (e.g., a diffusion coating, an electroless nickel plating, or a diamond like carbon coating), an elastomeric cartridge 90 may not adequately bond to the torsion bar 80, leading to separation of the two components. An enhanced binding process is employed to strengthen the bond between an elastomeric cartridge 90 and coated torsion bar 80 over the strength of bonds that can generally be achieved with a conventional compression molding process. The enhanced binding process utilizes a first primer layer applied to the torsion bar 80 followed by application of a cover layer.

The enhanced binding process begins with cleaning and degreasing the torsion bar 80. Next, the primer layer is formed by applying a first bonding agent to the torsion bar 80. The first bonding agent can generally comprise a resin material, such as phenolics, isocynates, and other specific ingredients that are dissolved in organic solvents like toluene, perchloroethylene, and xylene. The primer should achieve good wetting of the metal surface and can be applied by brushing, dipping, or spraying to achieve a coating thickness of approximately 10 microns to 20 microns with a thickness of 10 microns being suitable for use with a cover layer.

For one embodiment, the primer layer was formed using a first bonding agent of Cilbond 10E manufactured by Kommerling® UK, Ltd. that is an adhesive-type compound that comprises at least the following chemical components: (i) 4-methylpentan-2-one (50-70%); (ii) toluene (<10%); (iii) zinc oxide (<5%); (iv) methenamine (<0.5%); and (v) maleic anhydride (<0.5%). Cilbond 10E bonds well to metal substrates as well as to polar thermoplastic (e.g., polyamides), thermoset plastics, epoxies, and various rubber compounds, including nitrile butadiene rubber, polyacrylate rubber, and mixtures of nitrile butadiene rubber with polyvinyl chloride. The ability to bond to nitrile compounds allows the primer layer to bond with a torsion bar 80 when coated with a carbonitride protective coating, as discussed below. After application of the first bonding agent, the torsion bar 80 and primer layer are heated to cure the primer layer.

After curing the primer layer, a cover layer is formed by applying a second bonding agent. The second bonding agent can be a solvent-based adhesive, such as a halogenated polymer with specific additives like silanes, fillers (carbon black) and organic solvents. The cover layer has to react with the rubbers to give good bonding between the metal torsion bar 80 and the rubber cartridge 90. Continuing with the example embodiment referenced above, the cover layer was formed using a second bonding agent of Cilbond 80ET manufactured by Kommerling® UK, Ltd. that comprises at least the following chemical components: (i) xylene (50%-60%); (ii) toluene (20-30%); (iii) N,N'-(M-phenylene)Dimaleimide (<1%); and (iv) carbon black. Cilbond 80ET bonds well to a variety of rubber materials, including, but not limited to, polyisoprene rubber, styrene butadiene rubber, and nitrile rubbers. The second binding agent can be applied by brushing, dipping, or spraying to achieve a coating thickness of approximately 12.5 microns to 25 microns.

Once the primer layer and the cover layer are applied and sufficiently dried, the torsion bar 80 is placed into a mold cavity to commence formation of the cartridge 90 through compression molding. The uncured polyisoprene rubber is placed in the mold tool surrounding the torsion bar. The mold is maintained at the curing temperature of the rubber compound and the mold halves are pressed together to force the rubber to fill the mold cavity. The mold remains closed for 10-15 minutes to cure the rubber and activate the second bonding agent. No post cure is required after removal of the cartridges from the mold.

Pull tests were performed on a carbonitride coated steel torsion bar 80 and polyisoprene cartridge 90 that were bonded together using the enhanced binding process described above. The pull test applied opposing tensile or "pull" forces to the torsion bar 80 and the cartridge 90. Test results showed that the bulk polyisoprene material failed before the cartridge 90 and the torsion bar 80 were pulled apart at the bonding location. In other words, the mechanical strength of the bond achieved with the enhanced binding process exceeded the ultimate strength of the cartridge 90 itself, and the isoprene rubber tore with the bond between the cartridge 90 and torsion bar 80 still intact. This demonstrated a substantial improvement over cartridge 90 and torsion bar 80 embodiments that were formed without the enhanced binding process where the cartridge 90 showed a tendency to separate from the torsion bar 80.

Example Embodiment Dimensions

The dimensions of an example embodiment made from 1040 steel are provided as follows to illustrate the approximate sizing and proportion of axle assembly components. Those of skill in the art will appreciate that the example embodiment dimensions are not intended to be limiting, and the components can be resized to meet the needs of a particular application or load requirement.

In one example embodiment, the assembly includes a spindle 20 that is approximately 8.1 inches long with a maximum diameter at the body portion of 1.72 inches. The threaded distal end 22 and the threaded proximal end 36 are approximately 1 inch in length and 1 inch in diameter. The conical portion 34 is approximately 1.7 inches long having a sidewall slope of about 10 degrees. The main body portion 32 is about 1.4 inches long. The approximate dimensions of the stepped cylindrical portions are: (i) a first stepped cylindrical portion 24 having a length of 0.74 inches and a diameter of 1.06 inches; (ii) a second stepped cylindrical portion 26 having a length of 1.7 inches and a diameter of 1.25 inches; and (iii) a third stepped cylindrical portion 28 having a length of 0.75 inches and a diameter of 1.38 inches. The stepped cylindrical portions (24, 26, 28) meet adjacent components at slightly arcuate joints having radii between 0.02 to 0.04 inches except that the third stepped cylindrical portion 28 meets the shoulder 30 at an arcuate joint having an approximate radius of 0.125 inches. The shoulder 30 has a width of about 0.02 inches and a chamfer angle of 45 degrees. The arcuate shape of the joints and shoulder 30 help reduce friction and mechanical stress when the spindle 20 is coupled to other components.

In the same embodiment, the torsion arm 50 is about 7.745 inches long as measured from the spindle socket 52 end to the torsion bar socket 58 end. The width of the spindle socket end 52 is about 2.850 inches, and the diameter of the torsion bar socket 58 end is about 2.75 inches, as measured in a direction that extends along the radius of both sockets but transverse to the length. The diameter of the spindle socket 52 opening is 1.85 inches, and the diameter of the torsion bar socket 58 opening is about 1.59 inches (as measured between the tips of the spline 82 teeth). The height of the spindle socket 52 end is approximately 2 inches, as measured in a direction that is coaxial with the spindle socket 52. The keys 54 have a height of approximately 0.3 inches. The length of the spindle socket 52 end is about 3.36 inches before transitioning to the angled neck portion 57. The height of the torsion bar socket 58 end is about 1.4 inches, as measured in a direction coaxial with the torsion socket 58. The length of the torsion bar socket 58 end is approximately 3.13 inches before transitioning to the angled neck portion 57 that itself has a length of approximately 1.3 inches. The angled neck portion 57 meets the spindle socket 52 end and the torsion bar socket 58 end at an arcuate joint defined by a circular radius of 1 inch.

Continuing with the example embodiment, the torsion bar 80 has an outer diameter of about 1.75 inches as measured both from the tips of the spline 82 teeth and along portions of the torsion bar 80 that are not covered by the spline 82. The spline teeth 82 are spaced 6 degrees apart along the outer surface of the torsion bar 80. The torsion bar 80 is approximately 15.7 inches long and disposed in a cartridge 90 that is approximately 12.35 inches long. The cartridge 90 has a square cross section that is 2.8 inches×2.8 inches.

In another embodiment where the torsion bar 80 and cartridge 90 are rated for use on a trailer with a 3,500 pound load capacity, the torsion bar 80 has a shorter length of about 14.7 inches to provide a universal fit for various sizes and load ratings of drop axle assemblies. In a drop axle, the axle tube 10 bends downward starting at a distance from each end of the axle tube 10. The cartridge 90 used for the 3,500 pound load capacity embodiment was a polyisoprene cartridge 90 having a shore A durometer hardness of 67-73.

As an example drop axle configuration, the axle tube 10 may curve downward starting at 15 inches from the splined end of the torsion bar 80 along the length of the axle tube 10 to form an S-shaped or V-shaped drop portion of the axle tube 10. In this example, if the torsion bar 80 is too long (i.e., longer than 15 inches), the cartridge 90 disposed about the torsion bar 80 will necessarily deform or bend to fit within the axle tube 10 at the drop portion. If the cartridge 90 is bent too far off center, the ability of the cartridge 90 to effectively absorb torsion loads is compromised. Shortening the torsion bar 80 prevents the cartridge 90 from being bent too far off center and avoids the resulting loss in mechanical strength.

Assembly Materials

The metallic components of the torsion axle assembly, including the spindle 20, brake flange 40, torsion arm 50, end cap 70, and torsion bar 80 can be made from a durable, highly corrosion-resistant steel material. Steel materials can be categorized as low alloy steels or high alloy steels where, for instance, low alloy steels include less than 4% of elements other than carbon and high alloy steels having greater than 4% of elements other than carbon. Steels can further be classified according to carbon content where, for instance: (i) carbon steel includes only iron and carbon; (ii) low carbon steel includes less than 0.3% carbon; (iii) medium carbon steel includes between 0.3 to 0.6% carbon; and (iv) high carbon steel includes more than 0.6% carbon. In general, higher carbon content leads to increased material strength but also leads to less corrosion resistance as higher carbon content steel materials oxidize more readily.

With regard to materials, conventional axle assemblies are made from plain carbon steel for increased strength, such as 1040 steel. The torsion axle assembly embodiments shown in the attached figures are made from medium carbon content, low alloy steels that provide sufficient material strength without sacrificing corrosion resistance. More specifically, the use of medium carbon, low alloy steel materials provides approximately the same yield strength as conventional axle assembly materials but with ultimate strength improved by 20% to 40%. The result is that the torsion axle assemblies disclosed herein will provide parts that begin to deflect or deform at similar loads as compared to conventional plain carbon steel assemblies, but the improved ultimate strength means that mechanical assemblies disclosed herein will tolerate increased force before failure or permanent deformation as compared to conventional plain steel assemblies. Suitable materials for the torsion axle assemblies disclosed herein could include, for example, a 4140 steel having carbon content between 0.38% and 0.43%.

The use of low alloy steel materials such as 4140 steel facilitates improvement in corrosion resistance. As compared to plain carbon steel materials, the low alloy steel materials have tighter tolerances for the component compound percentages, and the materials provide better corrosion resistance even prior to coating. Additionally, the low alloy steels can include chromium and molybdenum to enhance the efficacy of the coating process, such as the nitriding processes discussed below. An example suitable alloy content is shown below in Table 1. One of skill in the art will appreciate that Table 1 is not intended to be limiting, and any suitable alloy can be used that provides sufficient material strength and corrosion resistance. Table 2 below illustrates a comparison of the material properties between 1040 steel such as that used in conventional axle assemblies and 4140 steel of the type of material utilized in the present inventive torsion axle assemblies.

TABLE 1

Example Alloy Content

| | |
|---|---|
| Chromium | 0.80-1.10% |
| Manganese | 0.75-1.00% |
| Silicon | 0.15-0.30% |
| Molybdenum | 0.15-0.25% |
| Sulfur | 0.040% |
| Phosphorous | 0.035% |

TABLE 2

Material Property Comparison

| | AISI 1040 | AISI 4140 |
|---|---|---|
| Melting Point | 1521 | 1416 |
| Tensile Strength | 620 | 655 |
| Yield Strength | 415 | 415 |
| Bulk Modulus | 140 | 140 |
| Brinell | 201 | 197 |

TABLE 2-continued

Material Property Comparison

|  | AISI 1040 | AISI 4140 |
|---|---|---|
| Knoop | 223 | 219 |
| Rockwell B | 93 | 92 |
| Rockwell C | 13 | 13 |
| Vickers | 211 | 207 |
| Machinability | 60 | 65 |

Protective Coatings and Corrosion Testing

The corrosion resistance, chemical resistance, and surface hardness of the assembly components are improved by forming a protective coating over the components. The coating processes disclosed herein result in a non-sacrificial barrier-type protective coating. Preferred non-sacrificial barrier coatings include diffusion coatings, electroless nickel plating, and diamond like carbon coatings. Preferably, the protective coatings have a surface hardness in the range of 700-1500 HV or greater. The hardness rating in "HV" is determined using the Vickers test and calculated as $HV=1.854(F/D^2)$, with F being the applied load (measured in kilograms-force) and $D^2$ being the area of the indentation (measured in square millimeters).

The primary cause of corrosion in iron alloys, such as steel, is galvanic corrosion, caused by an electrical current that forms on the surface of the metal when exposed to a corrosive environment. The current will pull electrons from iron atoms and leave them with a positive charge. The electrons from the iron will bond with moisture in the environment and form hydroxide ions. The positively charged iron atoms in the component then bond with hydroxide ions from the environment to form unstable ferrous hydroxide, which decomposes to iron oxide, or rust.

Sacrificial coatings form a metallic layer or structure that has a lower electrical potential than the surrounding material that is being protected. The sacrificial coating undergoes an anodic reaction and will corrode before the material it is protecting because of its lower electrical potential. As the sacrificial coating is corroded, the protective effects are diminished. Examples of sacrificial coatings include zinc-coated steel, galvanized steel, and tin plated steel.

Protective coatings can also combat corrosion by providing a physical barrier or providing a sacrificial layer that degrades before the substrate to be protected. Non-sacrificial barrier protective coatings prevent corrosive materials from reaching the underlying substrate so that conditions cannot be met for electrons to disassociate from the substrate materials. Barrier protective coatings are preferably made of a material that is chemically inert and that will not chemically react with corrosion inducing substances in the operating environment. The barrier protective coating is also preferably made of a material that will resist mechanical and abrasive wear to ensure it will last the operational lifespan of the component. Barrier protective coatings do not corrode away to protect the underlying component metal. As long as a barrier protective coating remains on the component and is free of voids or defects, corrosion will continue to be prevented.

Prior to applying a non-sacrificial barrier coating, the surfaces of the mechanical assembly components can be conditioned using techniques such as vibratory polishing, grinding, bead blasting, shot peening, or sanding. The shot peen process works by impacting the component surface with small metallic spheres at high speeds, leaving small indentations across the entire surface of the component. For surfaces that do not yet have a protective coating applied, the deformation of the component surface by the indentations results in residual compressive stress that creates a hardened surface. The indentations also flattens the component surface by pushing down high spots and filling in voids.

The non-sacrificial barrier coatings disclosed herein form a durable, permanent, physical barrier to oxidation and contaminants and differ from sacrificial coatings that are consumed and degrade over time. The non-sacrificial barrier coating can then be applied to the conditioned surfacing using processes such as diffusion coating, electroless nickel plating, and physical vapor deposition ("PVD") to form diamond like carbon coatings.

Suitable diffusion coating processes should preferably result in a stable compound layer (white layer) consisting of iron carbonitride molecules at a case depth of approximately 10-25 µm. Enhanced performance is achieved where the coating involves a post-oxidation process that forms a layer of protective black iron oxide on the outer surface of the compound layer. Suitable diffusion coating techniques include, but are not limited to, liquid ferritic nitrocarburizing, gas nitriding, or other thermochemical diffusion methods that meet the aforementioned white layer and hardness parameters.

In one embodiment, the torsion axle assembly is subjected to a liquid ferritic nitrocarburizing coating process, with a variation known as Melonite or QPQ bath nitride, which constitutes a thermochemical case hardening process. This is a shallow case variation of the nitriding process. During coating, carbon and nitrogen atoms are diffused into the surface of a ferrous metal component that is suspended in a molten salt bath. The result is enhanced surface hardness, wear resistance, and corrosion resistance.

The liquid ferritic nitrocarburizing coating process forms two distinct layers in the surface of a component called the compound layer (also known as the "white layer") and the diffusion layer. The compound layer is formed by the reaction of carbon and nitrogen atoms from the salt bath with the component's surface iron atoms, forming stable iron carbonitride compounds. The compound layer forms a thin protective shell into the surface of the component which substantially increases surface hardness and corrosion resistance.

The diffusion layer forms from carbon and nitrogen atoms that diffuse through the compound layer without reacting with iron as they diffuse into the core of the component. The carbon and nitrogen will remain in a solid state and find positions within the iron crystal lattice leading to increased hardness of the component material in this region. The diffusion layer has a gradient with high concentrations of unbonded carbon and nitrogen atoms directly below the compound layer that decrease in concentration in a direction away from the surface of the component.

Alloy steel is particularly well suited for nitriding processes due to certain alloying elements, such as aluminum, chromium, molybdenum, titanium, and vanadium. These alloying elements form stable compounds with carbon and nitrogen at nitriding process temperatures. These stable compounds can form in both the compound layer and diffusion layer. The stable compounds will precipitate out as small crystals in the iron grain structure and provide additional hardness.

An additional layer of protective black iron oxide (magnetite) can be formed on the surface of the component by a post-oxidation process. Performing the ferritic nitrocarburizing coating process followed by formation of a protective black iron oxide is collectively referred to as a QPQ process. The black iron oxide layer extends a depth into the surface of the component material and substantially improves the corrosion and wear resistance of the component. Formation of the black iron oxide layer is considered a passivation process where formation of oxide a depth into the surface of a material impedes further oxidation by blocking moisture and/or oxygen from reaching the base metal. Notably, steel will not form a protective oxide layer at ambient temperatures but instead forms red iron oxide that does not bond well to the base steel, thereby leaving the base steel susceptible to corrosion.

As part of the process for forming the black iron oxide, the component will first go into a preheat furnace to get the component close to the salt bath temperature. Once at temperature, the component will be immersed in a bath of liquid alkali cyanate salt, which will provide the nitrogen and carbon atoms during the reaction with the steel part. The part will remain in the bath for up to two hours generally. The salt bath will be maintained at a temperature of between 525° C. to 625° C. with 565° C. being a typical process temperature. At this temperature range, iron is still in the ferrite phase. At higher temperatures, specifically above 723° C., the iron would transition into the austenite phase and result in recrystallization and component deformation.

After immersion in the bath of liquid alkali cyanate salt, the surface of the component can be polished, or conditioned a second time, using one or more methods, such as vibratory polishing, grinding, bead blasting, shot peening, or sanding. The preferred surface conditioning technique is a media impact type treatment that results in a case hardened surface while closing any voids and imperfections on the surface. Stainless steel shot peening, for example, impinges stainless steel beads as a shot media on the component surface using a stream of compressed air or the centrifugal force of a rotating wheel. In one embodiment, the shot media used was a stainless steel S70 shot having a diameter in the range of 0.005 to 0.017 inches. Shot peening after formation of a protective coating primarily serves to flatten the component surfaces by pushing down high spots and filling in voids.

Following the surface conditioning, the part will go to a second oxidation bath. The second oxidation bath is performed at a similar temperature to the first bath but for a shorter duration of up to 30 minutes to form a black iron oxide layer on the surface, After oxidation, the component will be fully quenched and cleaned in a water bath. A rust preventative oil is commonly applied following the second bath to fill any pores left in the material surface.

In another embodiment, a diamond like carbon ("DLC") layer is created on the metallic components of the torsion axle assembly using a physical vapor deposition process. The diamond like carbon layer is an amorphous carbon material that displays some properties similar to diamond, including high hardness. The diamond like carbon layer provides advantages that include a low coefficient of friction, high micro-hardness, corrosion resistance, high electrical resistivity, and low chemical reactivity. Diamond like carbon film friction coefficient against steel generally ranges from 0.05-0.20. Hardness can be tailored for specific applications and range from 500 HV to 9000 HV depending on, among other factors, the carbon hybridization and metal content. The PVD process is performed in a vacuum environment at relatively low temperatures (e.g., below 150° C.) and uses ionized, carbon carrying gas that is drawn to the surface of the material to be coated by an electrical charge.

In yet another embodiment, an electroless nickel coating is formed on the assembly components. Electroless nickel coating is performed by placing the components into an aqueous bath containing nickel salt (e.g., nickel sulfate) and either a phosphorus-containing or borohydride reducing agent to yield either a nickel-phosphorous alloy coating or a nickel-boron coating. The process results in a uniform, evenly deposited nickel alloy protective coating with hardness ratings between 850 HV to 1200 HV after a post-bath heating.

Unlike electroplating, the electroless plating process does not require passing an electrical current through the bath and substrate to be coated. Instead, the nickel cations are reduced to a nickel alloy through chemical reactions with the phosphorus or boron-containing reducing agent. The process begins with nickel cations in the bath replacing iron atoms at the surface of the component being treated, which results in a strong initial metal-to-metal bond between the component and the protective coating. Once the initial layer of nickel is formed, the reaction at the component surface will catalyze itself, and nickel alloy will continue to deposit on the component surface. The chemical reaction can be catalyzed using other metals as well, such as cobalt, palladium, or rhodium.

The coating thickness is determined by the time spent in the bath. Coating thickness is typically 0.0002 to 0.002 inches. After the desired coating thickness is reached, the component is removed from the bath and rinsed with water to remove any remaining bath solution from the component. The aqueous bath may contain other components, including, without limitation, complexing agents to increase phosphate solubility, stabilizers to slow the reaction, or buffers to main bath acidity. After plating, the coating can be heated to improve hardness and adhesion of the plating and to anneal internal stresses in the coating. Electroless nickel plating can optionally be followed by formation of a diamond like carbon coating to form a second protective coating.

The above-described coating processes result in a material that is highly corrosion resistant and durable and enables a mechanical assembly to be manufactured with separable, modular components. The modular component design provides the advantage over conventional assemblies in that individual components can be replaced as part of a repair, thereby reducing the cost, complexity, and time required to perform the repair. Existing axle assemblies are manufactured with integrated components because separate components are prone to corrosion that fuses the components together. To illustrate with reference to torsion axle assemblies, conventional axle assembles are manufactured with either (i) the torsion arm and spindle being a single, integral component, or (ii) with the torsion arm and torsion bar being a single, integral component. In both cases, it may be necessary to replace at least two functionally separate but integrated parts during a repair. However, with the modular torsion axle assemblies disclosed herein, each part can be replaced individually so that only the damaged component must be replaced during a repair.

The enhanced corrosion resistance of assembly components was verified through salt-spray testing performed according to the ASTM B117-11 standard. Four spindles were tested by suspending the spindles in a heated chamber at a temperature of 95° F. Hot, humid air is created by bubbling compressed air through a tube (e.g., using a bubble tower or humidifying tower) full of hot deionized water at 118° F. The heated, humid air is mixed with a salt solution of 5% salt by weight and injected into the chamber through a spray nozzle to create a corrosive salt fog.

The test spindles were observed every 25 hours for signs of corrosion. At the observation intervals, the spindles are given a score from 0 to 4 as follows: "0" indicates no color, "1" indicates some color, "2" indicates half color, "3" indicates mostly colored, and "4" indicates totally colored. The color refers to visible corrosion seen on the surface of each sample.

The four test spindles included a control that had no protective coating and three spindles that were treated with a ferritic nitrocarburizing coating followed by formation of a black iron oxide layer i.e., the QPQ process. Two of the three coated spindles underwent a surface conditioning treatment prior to the second oxidation bath of the QPQ process. One spindle was conditioned using glass bead blasting, and one spindle was treated with stainless steel bead blasting. The last spindle did not undergo a surface conditioning treatment as part of the QPQ process.

The uncoated spindle showed the poorest performance with visible corrosion at the first 25-hour observation point. The spindle conditioned with stainless steel bead blasting showed the best performance with no observable corrosion after 250 hours at which point the test was concluded. The remaining two spindles first showed signs of corrosion at the 225 hour observation point. At the conclusion of the test, the uncoated spindle showed corrosion over nearly the entire surface area whereas two of the coated spindles showed minor signs of corrosion over just a small portion of the surface area. The results are summarized in Table 3:

TABLE 3

Salt Spray Corrosion Testing

| Sample No. | Treatment | Total Hours of Continuous Testing without Visible Corrosion |
| --- | --- | --- |
| 1 | Uncoated | <25 hours |
| 2 | QPQ nitrocarburizing | 225 hours |
| 3 | Glass Bead Prep + QPQ nitrocarburizing | 225 hours |
| 4 | Stainless Steel Bead Prep + QPQ nitrocarburizing | 250 hours |

The corrosion testing results showed that the components treated with a non-sacrificial, molecular bonded coating performed far superior to the uncoated component.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A torsion axle assembly comprising (I) a spindle having a conical portion, (II) a torsion bar, (III) a cartridge, and (IV) a torsion arm, wherein:
   (a) the torsion bar comprises a tip and a first set of splines residing on the tip;
   (b) the cartridge is disposed about a portion of the torsion bar, wherein the torsion bar tip extends outward from a first end of the cartridge;
   (c) the torsion arm comprises a spindle socket and a torsion bar socket, wherein
      (i) the torsion bar socket comprises a second set of splines formed on an interior surface of the torsion bar socket,
      (ii) the torsion bar tip extends into the torsion bar socket such that the first set of splines mates to the second set of splines,
      (iii) the spindle extends into the spindle socket, and the spindle conical portion frictionally engages an interior surface of the spindle socket, wherein the spindle comprises (A) a first stepped portion and a second stepped portion, and (B) a fusible link between the first stepped portion and the second stepped portion,
      (iv) the fusible link is configured to sever thereby separating the first stepped portion from the second stepped portion when both (A) a force is applied to the first stepped portion or the second stepped portion, and (B) the applied force exceeds a predetermined force threshold value; and wherein
   (d) the spindle, torsion bar, and torsion arm each further comprise a protective coating.

2. The torsion axle assembly of claim 1, wherein one or more of the spindle, torsion arm, and torsion bar comprise a low alloy, medium-carbon steel.

3. The torsion axle assembly of claim 1, wherein the protective coating is formed using a process selected from one of a liquid ferritic nitrocarburizing coating process, a diamond like carbon coating process, or an electroless nickel plating process.

4. The torsion axle assembly of claim 2, wherein the protective coating is formed using a process selected from one of a liquid ferritic nitrocarburizing coating process, a diamond like carbon coating process, or an electroless nickel plating process.

5. The torsion axle assembly of claim 1, wherein the spindle, torsion bar, and torsion arm each (i) have a surface hardness greater than 700 HV, and (ii) comprise a compound layer of iron carbonitride having a depth of 10-25 μm from an outer surface.

6. The torsion axle assembly of claim 1, wherein the protective coating comprises iron carbonitride.

7. The torsion axle assembly of claim 6, wherein the spindle, torsion bar, and torsion arm each further comprise a layer of black iron oxide.

8. The torsion axle assembly of claim 1, wherein the protective coating is a diamond like carbon coating.

9. The torsion axle assembly of claim 1, wherein the protective coating comprises a nickel alloy.

10. The torsion axle assembly of claim 1, wherein:
    (a) the cartridge comprises an elastomeric material;
    (b) the torsion bar further comprises
       (i) a primer layer disposed on an outer surface of the torsion bar, wherein the primer layer comprises a first bonding agent, and
       (ii) a cover layer disposed on the primer layer, wherein the cover layer comprises a second bonding agent; and wherein
    (c) the cartridge is molded to the torsion bar.

11. A torsion axle assembly comprising:
    (a) a cartridge secured within an axle tube, wherein the cartridge comprises and elastomeric material;
    (b) a torsion bar secured within the cartridge, wherein the torsion bar comprises
       (i) a tip having a first set of splines extending around the outer circumference of the tip,
       (ii) a non-sacrificial protective coating disposed on an outer surface of the torsion bar where the non-sacrificial coating comprises one of a diffusion coating, an electroless nickel plating, or a diamond like carbon coating, (iii) a primer layer disposed on the outer surface of the torsion bar on top of the non-sacrificial protective coating, said primer layer comprising a first bonding agent, and
(iv) a cover layer disposed on the primer layer, said cover layer comprising a second bonding agent; and wherein
(c) a bushing disposed about the torsion bar;
(d) an end cap affixed to the axle tube, wherein (i) the bushing is secured within an end cap bore, (ii) the torsion bar tip extends through the bushing and through the end cap bore, and (iii) the torsion bar tip extends into and is secured within a torsion bar socket having a second set of splines configured to couple to the first set of splines;
(e) a torsion arm comprising (i) the torsion bar socket, (ii) a spindle socket, and (iii) a neck extending between the torsion bar socket and the spindle socket;
(f) a planar brake flange comprising a brake flange void, wherein the brake flange is coupled to the spindle socket;
(g) an elongated spindle secured within the spindle socket; and
(h) a protective coating disposed on an outer surface of the torsion bar, torsion arm, and spindle.

12. The torsion axle assembly of claim 11, wherein the protective coating comprises at least one of iron carbonitride, a diamond like carbon material, or a nickel alloy.

13. The torsion axle assembly of claim 11, wherein the protective coating is formed using a process selected from one of a liquid ferritic nitrocarburizing coating process, a diamond like carbon coating process, or an electroless nickel plating process.

14. A torsion axle assembly comprising:
(a) a torsion arm that comprises a spindle socket and a torsion bar socket;
(b) a torsion bar having a tip that is housed within the torsion bar socket;
(c) a spindle secured within the spindle socket, wherein
    (i) the spindle comprises a first stepped portion and a second stepped portion,
    (ii) the spindle further comprises a fusible link between the first stepped portion and the second stepped portion, and
    (iii) the fusible link is configured to sever thereby separating the first stepped portion from the second stepped portion when both (A) a force is applied to the first stepped portion or the second stepped portion, and (B) the applied force exceeds a predetermined force threshold value;
(d) a protective coating disposed on the torsion arm, torsion bar, and spindle, wherein the protective coating comprises at least one of iron carbonitride, a diamond like carbon material, or a nickel alloy;
(e) a primer layer disposed on an outer surface of the torsion bar, wherein the primer layer comprises a first bonding agent;
(f) a cover layer disposed on the primer layer, wherein the cover layer comprises a second bonding agent; and
(g) a rubber cartridge bonded to the torsion bar, wherein the tip of the torsion bar extends outward from a first end of the cartridge.

15. The torsion axle assembly of claim 14, wherein the protective coating comprises a conditioned surface made from a shot-peened material.

16. The torsion axle assembly of claim 14, further comprising a layer of black iron oxide disposed on the torsion arm, torsion bar, and spindle.

17. The torsion axle assembly of claim 14, wherein the spindle further comprises:
(a) a first stepped portion and a second stepped portion; and
(b) a fusible link between the first stepped portion and the second stepped portion.

18. The torsion axle assembly of claim 14, wherein:
(a) a cartridge is disposed about the torsion bar, wherein the tip of the torsion bar extends outward from a first end of the cartridge along a first axis; and
the cartridge and torsion bar have a length in the direction of the first axis, wherein the length is between 14 inches and 14.7 inches.

* * * * *